United States Patent
Yuba et al.

(10) Patent No.: US 8,203,643 B2
(45) Date of Patent: Jun. 19, 2012

(54) AUTOMATIC FOCUSING DEVICE

(75) Inventors: Motohiro Yuba, Hirakata (JP);
Kazuhiro Tsujino, Matsubara (JP);
Takeshi Fujiwara, Hirakata (JP)

(73) Assignee: SANYO Electric Co., Ltd., Moriguchi, Osaka (JP)

( * ) Notice: Subject to any disclaimer, the term of this patent is extended or adjusted under 35 U.S.C. 154(b) by 345 days.

(21) Appl. No.: 12/207,623

(22) Filed: Sep. 10, 2008

(65) Prior Publication Data
US 2009/0073305 A1    Mar. 19, 2009

(30) Foreign Application Priority Data
Sep. 10, 2007   (JP) .................... 2007-234405

(51) Int. Cl.
*G03B 13/00* (2006.01)
*H04N 5/232* (2006.01)
(52) U.S. Cl. .......... 348/345; 348/208.12; 396/90; 396/133
(58) Field of Classification Search .......... 348/345, 348/208.12; 396/90, 133; 345/619
See application file for complete search history.

(56) References Cited

U.S. PATENT DOCUMENTS

| 6,430,368 | B1 | 8/2002 | Hata | |
|---|---|---|---|---|
| 2004/0212721 | A1* | 10/2004 | Watanabe | 348/345 |
| 2005/0128221 | A1* | 6/2005 | Aratani et al. | 345/619 |
| 2006/0198624 | A1* | 9/2006 | Ono et al. | 396/133 |

FOREIGN PATENT DOCUMENTS

| JP | 2001-066494 A | 3/2001 |
|---|---|---|
| JP | 2006-243527 A | 9/2006 |
| JP | 2007-036775 A | 2/2007 |

OTHER PUBLICATIONS

Japanese Office Action dated May 10, 2011, issued in corresponding Japanese Patent Application No. 2007-234405.

* cited by examiner

*Primary Examiner* — Nicholas Giles
*Assistant Examiner* — Stephen Coleman
(74) *Attorney, Agent, or Firm* — Westerman, Hattori, Daniels & Adrian, LLP

(57) ABSTRACT

An automatic focusing device in accordance with the present invention comprises an image sensor being subjected to exposure performed in a rolling shutter system, a focusing system including a focus lens for focusing on the image sensor, an AF evaluation value calculating unit calculating an AF evaluation value based on an imaging signal obtained from the image sensor, and an AF control unit controlling an operation of the focusing system based on an AF evaluation value of a focusing area set in a part of the imaging picture by the image sensor, and the AF control unit makes the AF evaluation value of a focusing area of each imaging picture and a focus lens position at the time of exposure for the focusing area correspond to each other, and drives the focusing system during the period which overlaps with an exposure period while searching the focus lens position where the AF evaluation value becomes maximum.

4 Claims, 4 Drawing Sheets

AUTOMATIC FOCUSING DEVICE

The priority application Number 2007-234405 upon which this patent application is based is hereby incorporated by reference.

BACKGROUND OF THE INVENTION

1. Field of the Invention

The present invention relates to automatic focusing devices conducting a focusing operation in accordance with imaging signals obtained from an image sensor, such as CMOS sensor, and provided in imaging devices such as a digital camera or a digital video camera.

2. Description of Related Art

Conventionally, in a digital camera provided with a CMOS sensor as an imaging device, while a frame period V is repeated as shown in FIG. 4, an exposure is performed at every horizontal scanning line sequentially from the highest horizontal scanning line La to the lowest horizontal scanning line Lb of an imaging picture obtained by the CMOS sensor. As a result, imaging signals for one frame are obtained by the CMOS sensor. This exposure system is called a rolling shutter system.

In the imaging operation described above, a focus lens is driven from the infinity position to the closest position, and autofocus operation to focus on the CMOS sensor is conducted based on the imaging signals obtained in this process. In the autofocus operation, a part of the imaging picture taken by the CMOS sensor is set as a focusing area. For example, in the case where a person's face is included in an imaging picture, the area including the face is automatically set as a focusing area. And then an autofocus evaluation value (for example, an integration value of high-frequency components) of the focusing area of every frame is calculated, and the position of the focus lens is adjusted so that the autofocus evaluation value becomes maximum.

In a digital camera having an image sensor of the rolling shutter system such as the CMOS sensor, the exposure periods are staggered in time from one horizontal scanning line to another as shown in FIG. 4. Therefore, a period D for driving the focus lens overlaps the exposure period.

In this case, since the autofocus evaluation value obtained by the exposure does not correspond to a certain focus lens position, conventionally, a given focus lens position such as a position at the time of exposure for the center line of the screen is regarded as a focus lens position corresponding to the evaluation value of the frame. However, this tentative focus lens position does not correspond to the autofocus evaluation value of the frame accurately, and therefore there has been a problem of low accuracy of peak detection in the autofocus operation.

Therefore, it has been proposed to increase the accuracy of the autofocus operation by reducing the driving amount of the focus lens for one frame so that the exposure period and the focus lens driving period do not overlap. However, in this method, in order for the exposure period and the focus lens driving period not to overlap, the driving amount of the focus lens for one frame must be reduced. Therefore, there has been a problem of taking a long time to complete focusing.

SUMMARY OF THE INVENTION

The present invention is to provide an automatic focusing device capable of realizing a rapid and highly accurate autofocus operation.

An automatic focusing device according to the present invention comprises:

an image sensor being subjected to exposure performed in a rolling shutter system;

a focusing system including a focus lens for focusing on the image sensor;

an autofocus evaluation value calculating unit calculating an autofocus evaluation value based on an imaging signal obtained from the image sensor; and an autofocus control unit controlling an operation of the focusing system based on the autofocus evaluation value of a focusing area set in a part of an imaging picture obtained by the image sensor.

The autofocus control unit makes the autofocus evaluation value of the focusing area of each imaging picture and a focus lens position at the time of exposure for the focusing area correspond to each other, and drives the focusing system during the period which overlaps with an exposure period for each focusing area while searching the focus lens position where the autofocus evaluation value becomes maximum.

In the automatic focusing device of the present invention described above, in the process of searching the autofocus lens position where the autofocus evaluation value becomes maximum, the autofocus evaluation value of the focusing area of each imaging picture corresponds to the focus lens position at the time of exposure for the focusing area. In addition, even if the focusing area moves with the progress of the frame, since the focus lens position is set in accordance with the move of the focusing area, the correspondence relationship between the autofocus evaluation value and a focus lens position is more accurate than in the conventional device in which the focus lens position is always set in the center of the screen.

Also, the focusing system is driven during the period which overlaps with the exposure period for each focusing area, and therefore a large driving amount of the focus lens can be set for one frame, thereby shortening the time required for the completion of focusing.

In a particular configuration, the automatic focusing device further comprises a focusing area deciding unit deciding the focusing area of each imaging picture. The focusing area position information is provided from the focusing area deciding unit to the autofocus control unit, and the autofocus control unit comprises a focus lens position calculating unit calculating the focus lens position at the time of exposure for the focusing area based on the position information.

The focus lens position calculating unit calculates the focus lens position at the middle of the exposure period for a representative horizontal scanning line of the plurality of horizontal scanning lines which form the focusing area as said focus lens position at the time of exposure.

According to the particular configuration described above, it is possible to make the autofocus evaluation value for the focusing area of each imaging picture and the focus lens position at the time of exposure for the focusing area correspond to each other more accurately.

In a further particular configuration, the autofocus control unit comprises a coarse adjustment unit controlling the focusing system to move by a coarse unit movement amount (greater movement distance than the depth of focus) and a fine adjustment unit controlling the focusing system to move by a fine unit movement amount (movement distance of around the depth of focus). The autofocus control is conducted by the coarse adjustment unit based on the autofocus evaluation value and the focus lens position.

In the particular configuration described above, first the coarse adjustment is conducted by the coarse adjustment unit.

In the coarse adjustment, the rapid autofocus control based on the autofocus evaluation value and the focus lens position is conducted, and then the fine adjustment is conducted by the fine adjustment unit around an optimum value found by the coarse adjustment. As a result, the focus lens is set at a highly accurate focus position.

As described, according to the automatic focusing device of the present invention, the correspondence between the autofocus evaluation value and the focus lens position is highly accurate, and the focus system is driven even during the exposure period for each focusing area, thereby realizing the rapid and accurate autofocus operation.

DETAILED DESCRIPTION OF THE INVENTION

In a preferred embodiment discussed in detail below with reference to drawings, an automatic focusing device of the present invention is implemented in a digital camera.

Figure 1:
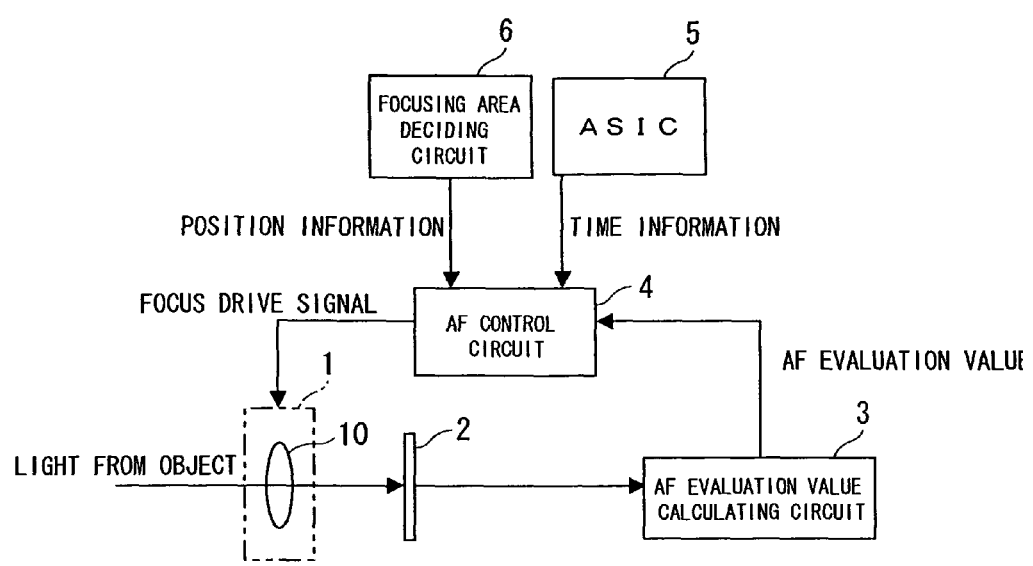
FIG. 1 is a block diagram illustrating a structure of an automatic focusing device in a digital camera according to the present invention.

As shown in FIG. 1, a digital camera according to the present invention comprises a focusing system 1 including a focus lens 10 through which light from an object passes, an image sensor 2 comprising a CMOS sensor into which the light is introduced after passing through the focus lens 10, an AF evaluation value calculating circuit 3 calculating an autofocus evaluation value (AF evaluation value) based on an imaging signal obtained from the image sensor 2, and an AF control circuit 4 producing a focus drive signal based on the AF evaluation value obtained from the AF evaluation value calculating circuit 3 and providing the signal to the focusing system 1. With this structure, in the focusing system 1, the focus lens 10 is driven in the optical axis direction, whereby the focusing operation is conducted. In the image sensor 2 comprising the CMOS sensor, the exposure is performed in the rolling shutter system.

A focusing area deciding circuit 6 and an ASIC 5 are connected to the AF control circuit 4. The focusing area deciding circuit 6, for example, recognizes a person's face included in the imaging picture to decide a partial area including the face as a focusing area, and provides information of the focusing area position (position information) to the AF control circuit 4. The ASIC 5 provides time information indicating the time progress in the autofocus operation to the AF control circuit 4.

The AF evaluation value calculating circuit 3 divides a whole or a center part without a surrounding frame part of the imaging picture into, for example, 256 blocks and sums high-frequency components of the imaging signal of each block, thereby calculating the AF evaluation value of the 256 blocks to provide the value to the AF control circuit 4.

Based on the position information obtained from the focusing area deciding circuit 6, the AF control circuit 4 extracts the AF evaluation value of one or more blocks corresponding to the focusing area from the AF evaluation values of the 256 blocks obtained from the AF evaluation value calculating circuit 3. And then, the AF control circuit 4 conducts an operation such as averaging process on the extracted AF evaluation value, thereby obtaining the AF evaluation value to be applied to the autofocus operation (applied area AF evaluation value).

Figures 2A, 2B:
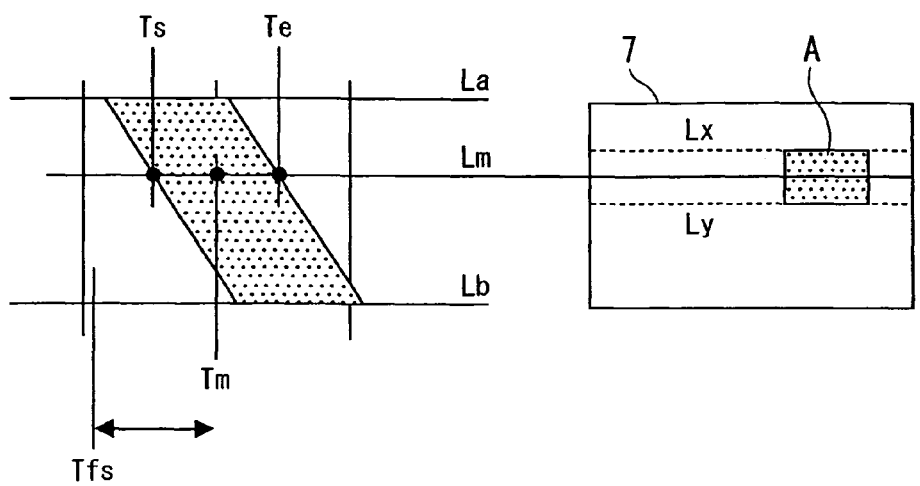
FIG. 2 shows a focus lens position at the time of exposure for a focusing area.

As shown in FIG. 2, the AF control circuit 4 calculates a middle time Tm between the starting time Ts and the end time Te of the exposure period for a representative horizontal scanning line Lm, which is located in the middle of the highest horizontal scanning line Lx and the lowest horizontal scanning line Ly of the focusing area A in the imaging picture 7. And then the AF control circuit 4 calculates the focus lens position Fi at the time of exposure for the representative horizontal scanning line of the current frame based on the formula 1 stated below. Here, F is the focus lens position at the end of the previous frame, V is a movement velocity of the focus lens, and Tfs is the starting time of focus driving in the current frame.

$$Fi = F + V \times (Tm - Tfs) \quad \text{Formula 1}$$

The AF control circuit 4 makes the applied area AF evaluation value correspond to the focus lens position Fi calculated with the formula 1, while driving the focusing system 1 to search the focus lens position where the applied area AF evaluation value becomes maximum.

Figure 3:
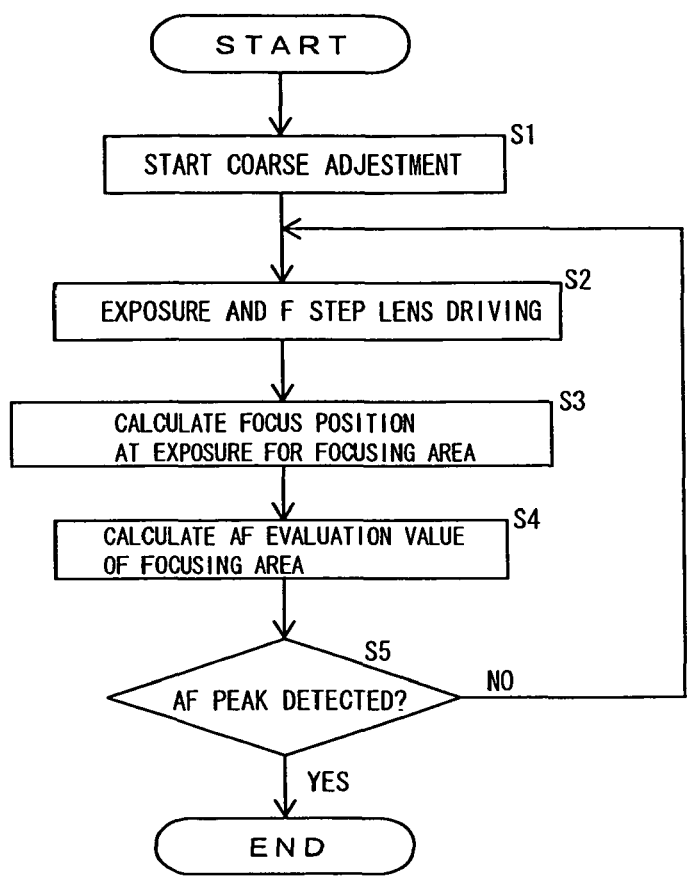
FIG. 3 is a flowchart showing a procedure of a coarse adjustment operation in the digital camera.
Figure 4:
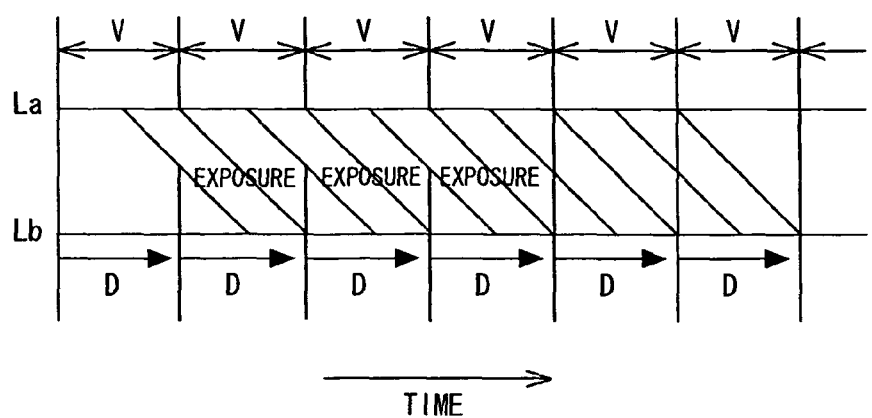
FIG. 4 is a time chart showing exposure periods performed in a rolling shutter system and focus lens driving periods.

FIG. 3 shows the coarse adjustment procedure conducted by the AF control circuit 4 in response to a shutter operation. First in step S1, the AF control circuit 4 starts the coarse adjustment operation. And then in step S2, the AF control circuit 4 performs exposure in the rolling shutter system for each frame while driving the focus lens by a greater unit movement amount than the depth of focus (F step), whereby the focus lens is driven during the period which overlaps with the exposure period as shown in FIG. 4.

Then in step S3, the AF control circuit 4 calculates the focus lens position at the time of exposure for the focusing area based on the formula 1 stated above, and in step S4, it calculates the AF evaluation value of the focusing area (applied area AF evaluation value).

Subsequently in step S5, the AF control circuit 4 determines whether or not it is detected that the applied area AF evaluation value reaches a peak. When it determines NO, the process returns to step S2, and the exposure and the driving of the focus lens are repeated. And then, when it determines YES in step S5, the coarse adjustment operation ends.

After the completion of the coarse adjustment operation, the fine adjustment operation to control the focus lens to move by the unit movement amount of around the depth of focus is conducted in the vicinity of the optimum focus lens position obtained by the coarse adjustment operation. In the fine adjustment operation, the autofocus control is conducted in the same way as the conventional autofocus control in which the center position of the imaging picture is set as a fixed focus lens position. Here, since the unit movement amount is fine, the highly accurate autofocus control can be realized. In addition, in the fine adjustment operation as well as in the coarse adjustment operation shown in FIG. 3, the autofocus control can be conducted based on the AF evaluation value of the focusing area and the focus lens position at the time of exposure.

Thus, the focus lens position where the AF evaluation value becomes maximum is set, and the imaging signal obtained at the time is recorded in a memory (not shown) after a predetermined signal processing is conducted on the signal.

According to the digital camera of the present invention described above, the correspondence relationship between the AF evaluation value and the focus lens position is highly accurate in the coarse adjustment operation, and the focus lens is driven even during the exposure period, thereby realizing the rapid and highly accurate autofocus operation.

The present invention is not limited to the foregoing embodiment in construction but can be modified variously by one skilled in the art without departing from the spirit of the invention as set forth in the appended claims. For example, the structure of the focusing area deciding circuit 6 is not limited to the structure in which a face included in the imaging picture is detected and the area including the face is decided as a focusing area. It is also possible to adopt a structure in which the focusing area is decided in different kinds of conventional ways.

What is claimed is:

1. An automatic focusing device comprising:
    an image sensor being subjected to exposure performed in a rolling shutter system;
    a focusing system including a focus lens for focusing on the image sensor;
    an autofocus evaluation value calculating unit calculating an autofocus evaluation value based on an imaging signal obtained from the image sensor; and
    an autofocus control unit controlling an operation of the focusing system based on the autofocus evaluation value of a focusing area set in a part of an imaging picture by the image sensor; and
    a focus lens position calculating means for calculating a focus lens position at the time when exposed to the focusing area, based on the exposure period about a representative single horizontal scanning line of a plurality of horizontal scanning lines constituting the focusing area, a focus lens position at the predetermined time outside the exposure time period and a movement velocity of the focus lens;
    wherein the autofocus control unit is adapted to drive the focusing system during a period which overlaps with an exposure period on each of the focusing areas to obtain the autofocus evaluation value while searching the focus lens position where the autofocus evaluation value becomes maximum, based on the correspondence of the autofocus evaluation value about the focusing area of each imaging picture obtained by the focus lens position calculating means and the focus lens position at the time when exposed to the focusing area,
    wherein the focus lens position calculating unit calculates the focus lens position at the middle of the exposure period for a representative horizontal scanning line of the plurality of horizontal scanning lines which form the focusing area as said focus lens position at the time of exposure, and
    wherein the autofocus control unit calculates a middle time between a starting time and an ending time of the exposure period to obtain said representative horizontal scanning line.

2. The automatic focusing device according to claim 1, wherein the autofocus control unit comprises a coarse adjustment unit controlling the focusing system to move by a coarse unit movement amount,
    wherein the autofocus control is conducted by the coarse adjustment unit based on the autofocus evaluation value and the focus lens position.

3. The automatic focusing device according to claim 1, wherein the focusing area deciding unit recognizes a face and instructs the autofocus control unit to focus on said face.

4. The automatic focusing device according to claim 1, wherein the autofocus control unit calculates a focus area such that an upper horizontal scanning line is located above said representative scanning line, and a lower scanning line is located below said representative scanning line.

* * * * *